(12) United States Patent
Schliebmann et al.

(10) Patent No.: US 7,037,429 B2
(45) Date of Patent: May 2, 2006

(54) WATER TREATMENT UNIT

(75) Inventors: Ursula Schliebmann, Owen (DE); Walter Trosch, Stuttgart (DE); Werner Sternad, Stuttgart (DE); Nobert Stroh, Magstadt (DE)

(73) Assignee: Fraunhofer-Gesellschaft zur Förderung derangewandten Forschung e.V., Munich (DE)

(*) Notice: Subject to any disclaimer, the term of this patent is extended or adjusted under 35 U.S.C. 154(b) by 216 days.

(21) Appl. No.: 10/182,790

(22) PCT Filed: Jan. 27, 2001

(86) PCT No.: PCT/EP01/00903

§ 371 (c)(1),
(2), (4) Date: Jan. 29, 2003

(87) PCT Pub. No.: WO01/56937

PCT Pub. Date: Aug. 9, 2001

(65) Prior Publication Data

US 2003/0150822 A1   Aug. 14, 2003

(30) Foreign Application Priority Data

Jan. 31, 2000   (DE) ............................... 100 04 096

(51) Int. Cl.
*C02F 3/00*   (2006.01)

(52) U.S. Cl. ...................... 210/607; 210/619; 210/622; 210/780

(58) Field of Classification Search ................ 210/607, 210/619, 622, 780
See application file for complete search history.

(56) References Cited

U.S. PATENT DOCUMENTS 6,168,724 B1 * 1/2001 Hurwitz ...................... 210/780

FOREIGN PATENT DOCUMENTS

| DE | 197 17 448 A1 | 10/1997 |
|----|---------------|---------|
| DE | 196 24 176 A1 | 1/1998  |
| DE | 196 47 512 A1 | 5/1998  |
| DE | 19648519      | 11/2000 |
| FR | 2799391       | 11/2001 |
| JP | 61274799      | 12/1986 |
| JP | 62273100      | 11/1987 |
| JP | 62279807      | 12/1987 |
| JP | 05076899      | 3/1993  |
| JP | 10128393      | 5/1998  |

* cited by examiner

*Primary Examiner*—Chester T. Barry
(74) *Attorney, Agent, or Firm*—Bateman IP Law Group (57) ABSTRACT

The invention at hand relates to an improved wastewater treatment plant consisting of a reactor and a filter device, such as for gaining drinking water or wastewater treatment.

28 Claims, 4 Drawing Sheets

WATER TREATMENT UNIT

The invention at hand relates to a device for the treatment of water, particularly wastewater and drinking water, as well as a method for performing the treatment of water using this device.

In the water treatment process, the treatment of water occurs with the goal of adjusting its consistency to the respective use, as well as to certain requirements. Methods for the treatment of drinking water include, for instance, methods for the precipitation, filtration, aeration, de-ironization, de-manganification, neutralization, disinfection, phosphatization, de-nitrification, and flouridization. Wastewater is water modified in its natural composition (drain water) by residential, commercial, industrial, agricultural, or other use, as well as the less polluted rain and snowmelt water draining from landscapes, whereby the type and concentration of the pollutants greatly depends on the origin of the wastewater. Physical, chemical and/or biological methods are used in the wastewater treatment that often must be used in combination in order to achieve a high degree of treatment efficiency. In chemical methods, pollutants are transferred into a form that is easier to remove, or into pollutant-free reaction products. Reactions are used, for example, that result in the oxidation, reduction, or the formation of hard to remove compounds.

In the biological method, the organic matters are metabolized to harmless compounds by means of microorganisms and microbes with a new formation of biomass. Generally, wastewater treatment is differentiated by aerobe and anaerobe wastewater treatment. The aerobe wastewater treatment occurs with the goal of essentially reducing oxygen-consuming substances, whereby organic substances are reduced by means of the formation of carbon dioxide, water, nitrates, and sulfates. Prerequisite for the aerobe working systems is a sufficient aeration with air (or air enriched with oxygen, or pure oxygen). The anaerobe wastewater treatment is also increasingly gaining importance, i.e., the geological degradation of organic matter under the exclusion of oxygen, whereby both obligate anaerobe microorganisms, for which oxygen is toxic, and facultative anaerobe microorganisms may be used. The anaerobe degradation is comprised of fermentation processes (such as alcohol, acetic acid, lactic acid, acetone, butanol fermentations, etc.).

In the physical method for wastewater treatment, the wastewater substances are concentrated according to their physical characteristics, such as particle size, density, and sink rate according to various methods. These include all methods that use solid auxiliary materials (such as adsorption, filtration, ion exchange), fluid auxiliary materials (extraction), gaseous auxiliary materials (flotation, stripping), thermal energy (distillation, vaporization), or gravity (sedimentation, flooding) as the separating agent. Particularly, methods of membrane technology, i.e., separating processes performed with the aid of membranes, are also used.

In addition to wastewater treatment, methods and devices of the membrane technology are also used in many scientific and industrial applications. Separation steps in the membrane technology can be classified by separation limits into the classes micro, ultra, and nano-filtration, as well as reverse osmosis. By means of these methods, particle sizes up to 5 nm can be separated. The solids are retained by the membrane, and are concentrated at least directly at the membrane, while the filtered fluid passes the membrane. By means of a so-called concentration polarization, a covering layer structure also known as membrane fouling, is caused, which may be structurally influenced by various operating methods. The dead-end and cross-flow filtration methods have prevailed as the classical operating methods. They differ essentially by the fact that no forced incoming flow of the membrane is created in the dead-end filtration, and the covering layer can therefore increase uncontrollably, while in the cross-flow filtration the membrane is cross-flowed specifically parallel to the surface, thus achieving control of the covering layer structure. However, after a long operation period, a reduction in the filtration flow still occurs, which is caused by a reversible covering layer formation. In both the dead-end and the cross-flow filtration methods a periodic backwashing has therefore been well tried, in order to achieve at least temporarily high and almost constant filtration flows. The typical specific energy consumption for a cross-flow ultra-filtration is, for instance, at 3 to 7 $kW/M^3$ in filtration flows of approximately 100 to 150 $l/m^2h$, and a transmembrane pressure of 43.5 psi [3 bar] to 72.5 psi [5 bar]. Comparable values are shown with the dead-end filtration, of approximately 0.1 to 0.5 $kWh/^3$ at filtration flows of approximately 50 to 80 $l/m^2h$ for a transmembrane pressure of approximately 7.25 psi [0.5 bar] to 29 psi [2 bar]. In high volume flows and at low added value, as is the case in communal and/or industrial wastewater treatment, or in the drinking water extraction from surface waters, this leads to an unfavorable cost situation. The dead-end filtration results in ever higher investments, however also in lower operation costs. This type of filtration still did not prove itself in this type of application, because its tendency to form covering layers can lead to operational problems. The cross-flow filtration is technically better suited for the stated application, but it does cause operation costs that are too high. That is why lately so-called submergible system have increasingly been used. These systems avoid the continuous re-pumping of the fluid phase, and therefore cause lower operation costs than cross-flow systems. Various forms of membranes are used, such as hollow fibers, pipes, or disks, with which the transmembrane pressure gradient is achieved on the filtrate side by means of creating a vacuum at the height of approximately 7.7 psi [0.5 bar] to 13.05 psi [0.9 bar]. These submergible systems are used, for instance, in aeration basins of wastewater treatment plants so that a certain reduction of the fluid phase of the covering layer formation by the motion of the fluid phase is possible due to the gassing occurring there. However, a substantial reduction of the filtration flow in time due to the uncontrolled formation of a covering layer is still an essential problem for an economic use of such submergible systems in wastewater treatment plants.

A filtration module is described in DE 196 241 76 C2 that consists of cartridges, which contain disk-shaped flat membranes into which the feed can flow from all sides from the exterior through the membranes. Permeate is discharged at the center through a central manifold. If this filter is operated as a cross-flow filter, it causes the problems described above, i.e., the energy costs will be very high. Mechanical damage may occur to individual membrane disks particularly at high overflow speeds and an input of the feed solution from the front.

The technical problem based on the invention at hand therefore exists in providing an economic method, and a cost-effective device for water treatment, particularly for the filtration of high volume flows at low added value, especially for the treatment of communal and industrial wastewater, or of drinking water extracted from surface waters.

The technical problem is solved by the invention by providing a device for the treatment of water, particularly of wastewater or industrial water, comprised of a reactor and a filter device in fluid connection with the reactor, whereby the filter device is arranged in the area of, or underneath of the reactor base, and has at least one filter element that is pivot-connected to a hollow pivoting carrier body, the interior of which forms a fluid connection to the interior of the carrier body in such a way that the filtrate can reach the interior of the carrier body from the interior of at least one filter element, and can be withdrawn there. The intended inventive arrangement of the filter device in the area of, or underneath of the reactor base, within or exterior of the reactor, enables the energetically advantageous use of the hydrostatic and/or hydrodynamic pressures for the creation of a transmembrane pressure gradient across the filter element that exists in many technical units. The inventive combination of filter device and reactor, whereby in a preferable embodiment of the invention, the filter device may be produced as a module with stacked filter disks that can be produced either of inorganic or organic material, initially enables the economic use of membrane technology for the filtration of high volume flows at a low added value, for instance in the treatment of fluids, or suspensions, respectively, particularly of communal or industrial wastewater, or in the gaining of drinking water from surface waters. According to the invention, a preferable embodiment of the invention intends to submerge the filter element arranged on the carrier body, that is the filter device, especially in the lower area of the reactor, into the fluid, or suspension, respectively, to be filtered, and rotate it around the longitudinal axis of the carrier body, preferably by a power drive. However, it may also be intended to arrange the filter device, that is the filter element arranged on the carrier body, in a preferably cylindrical housing, and to position it below the reactor. In such an embodiment, the filter device and the reactor are connected to one another by means of input and output connections, such as pipes or hoses. The housing is filled with the suspension to be filtered, whereby the carrier body rotates around its longitudinal axis is offset, for instance, by means of a motor. Filtrate is drawn by at least one filter disk that is pivot-connected to the carrier body, and discharged through the hollow shaft of the inventive device that forms a flow connection to the filter disk. By means of the fluid motion around and between the filter disks caused by the rotation, and the centrifugal force taking effect on it, the formation of a covering lay can be effectively avoided. The transmembrane pressure necessary for the filtration can occur, for instance, by applying a vacuum to the filtrate side of the device.

Preferably, however, as mentioned above, the hydrostatic or hydrodynamic pressure existing in many of the units suitable for the invention at hand, is used as a transmembrane pressure gradient. Modern wastewater treatment plants, for instance, have aeration reactors of a height of up to 20 m, thus enabling a transmembrane pressure gradient of almost 29 psi [2 bar] due to the hydrostatic pressure. Additionally, a dispersion of the aeration of the registered gas phase often occurs in aerobe operating reactors by means of fluid streams, for example, at velocities of up to 20 m/s. Additional usable hydrodynamic pressure of, for example, up to 29 psi [2 bar] are created in this way, if the filter device used according to the invention is assembled into the fluid circulation in front of a nozzle, such as a binary nozzle, for the input of fluid and/or gas, or a gas mixture, such as air, respectively. The invention enables the energetically advantageous isolation of the cross flow velocity necessary for the filtration and other fluid movements, as the cross flow velocity necessary for the efficient filtration is created by means of rotation of the filter element. The required pressure gradient is created equally automatically, and therefore at low cost, particularly at a large height and filling level of the reactor, by means of the existing hydrostatic pressure.

As opposed to the filtration devices for wastewater reactors known from the literature, the device according to the invention therefore has several advantages.

As opposed to cross-flow systems, substantially lower specific energy costs are the result, and there is no risk of clogging of the filter elements. Unlike with disk modules or Zee-Weed modules that are assembled into a wastewater reactor, there is the advantage that the oxygen supply of aerobe microorganisms is isolated from the filtration in the inventive device, as the air supply and the fluid circulation for the gas dispersion can be adjusted essentially independent of the desired filtration performance. The control of the formation of the covering layer is rather achieved by means of the rotation of the disk filter, and can therefore be adjusted independently of the supply of the aerobe microorganisms. By means of possibly intended assembly units, such as a circuit breaker in the filtration module, the formation of a covering layer can be further influenced. The transmembrane pressure is created by means of the hydrostatic pressure necessarily existing in the wastewater reactors, and additionally by means of the hydrodynamic pressure, if required, which is necessary for the gas dispersion with the aid of a fluid stream. Here, unlike with the cross-flow filtration, no noticeably additional pressure drop in the membrane module of the rotation disk filter is required as the through flow of the module is not required for the creation of high over flow velocities, but instead the hydrodynamic pressure is merely used, and the freely through-flowing cross section can therefore be selected at a large enough size so that practically no additional pressure drop, and therefore energy consumption, is created. This results in substantially lower specific energy costs, than with the cross-flow filtration.

According to the invention, a fluid connection between the interior of the carrier body and the interior of the filter element exists, i.e., a device that enables a fluid stream from one range or area into another range or area. This way the interior of the filter element can form a connection to the interior of the carrier body by means of one or several orifices, tubes, channels, lines, bores, slots, porous areas, and similar, so that a fluid stream can occur from the interior of the filter element into the carrier body interior, and a fluid connection is therefore created.

In a preferred embodiment of the invention at hand, the hollow carrier body is a hollow shaft, such as a pipe-shaped hollow shaft. In another preferred embodiment it can be intended that the filter element is constructed as a filter disk. The filter disk can, for instance, be constructed as a hollow body, or having a membrane, or as a hollow frame, respectively. According to the invention, for instance technical membranes commonly used in membrane technology may be utilized, such as polymer membranes, membrane filters, ultra-filtration membranes, or microfiltration membranes.

In another embodiment, the invention also relates to a previously mentioned wastewater treatment device with a reactor and filter device, whereby the hollow carrier body is in a housing, preferably pivot-linked in a housing, particularly a cylindrical housing. Such a housing may have, for example, an input from the reactor, and an output, whereby fluid to be filtered can be placed into the housing by means of the input, and the separated solids can be removed by means of the output. The inflow of the suspension to be filtered preferably occurs tangentially. This way the rotation of the fluid is supported, and a mechanical stressing of the filter disks by an impingement of the suspension to be filtered is reduced to a minimum. The solids, also called concentration, can be discharged by means of a tangential discharge at the cylinder wall, or at the lower face wall. The filtrate exits the housing through the hollow carrier body.

The invention intends in another preferred embodiment that assembly units may be intended in the housing of the filter device for influencing the flow, such as a circuit breaker.

In a preferred embodiment of the invention, the filter elements have clearance orifices for receiving the carrier body. In a preferred embodiment, the filter elements are at a distance to one another, whereby in a further preferred embodiment, the longitudinal axis of the carrier body is vertical to the upper and lower sides, i.e., the base surfaces, of the filter elements constructed as filter disks.

The invention therefore intends that at least one filter disk is attached by means of a pivot connection to a pivoting hollow shaft in such a way that the filtrate can be withdrawn through it. In particular, the hollow shaft can be constructed as one piece, and can push at least one of the filter disks through a clearance orifice that is arranged in the center of the latter in a preferred embodiment, whereby at least one orifice is intended in the area of the hollow shaft that surrounds the filter disk with its interior lateral area so that fluid from the filter disk can get into the interior of the hollow shaft.

In another embodiment it can be intended that the carrier body, particularly the hollow shaft, is constructed of several pieces of various hollow sections, such as multi-shaped hollow sections, whereby the various sections of the carrier body are separate toward the input fluid to be filtered, and equally connected in a fluid seal by means of the same by filter elements arranged between the sections. In this embodiment, a fluid connection, such as an orifice between the interior of the carrier body and the filter element, is also intended. The filtrate penetrating the interior of the filter disks can get from the interior of the filter disk into the interior to the hollow shaft in this way, and be discharged by it.

The invention further intends that the filter device used according to the invention is constructed as a modular assembly.

The filter device used according to the invention can be used either in aerobe or anaerobe operating systems, such as in wastewater treatment or wastewater processing systems. For instance, the filter device can be assembled in the aerating phase of a wastewater treatment plant, and represents a modern system for biomass retention, and therefore for the concentration of biomass. According to the invention, the filter device can, of course, also be used for the separation of the input flow to wastewater treatment plants after, or instead of the preliminary wastewater treatment. This separates the input flow into a carbon-rich concentrate that can be converted anaerobe into biogas, and into a carbon-low filtrate that can be converted aerobe in, for instance, high-performance wastewater reactors. Of course, it is also possible to use the inventive device for gaining drinking water from surface waters. The inventive device can also be constructed as a device containing units for the carrying in of air or gas, and allows aerobe operations. The inventive device can also be constructed as an air, or gastight sealed device, or as a device equipped with an air or gastight reactor, or even as a device allowing an anaerobe operation by other means. Such a device of the latter type allows a filtration that is low in operating costs in the course of bioprocesses that require no aerial oxygen, such as denitrification, or no oxygen at all, such as lactic acid, ethanol, or acetone-butanol fermentation.

The problem based on the invention is also solved by means of providing a method for the treatment of water, particularly wastewater and drinking water, in the course of which a separation of a filtrate from solids occurs from the water to be purified, and whereby one of the inventive devices is used. Particularly, the invention thereby relates to a method for gaining drinking water, or for the treatment of wastewater, according to which an inventive filter device is to be used, i.e., a hollow and pivoting carrier body, that is connected pivot-proof to at least one filter element, in for instance, a housing, that is essentially under the influence of only hydrostatic and/or hydrodynamic pressure. It is exposed to the water to be purified, and is offset into a pivoting movement for the creation of an overflow velocity, and the filtrate flowing in through at least one of the filter elements into the interior of the hollow carrier body is discharged by the hollow carrier body, and the concentrate is separated. Applying a vacuum on the filtrate side, or applying overpressure on the inflow side instead of, or in addition to the previously described hydrostatic or hydrodynamic pressure, can also be intended.

According to the method of the invention at hand, the fluid or suspension contained in the reactor that is to be purified, creates a hydrostatic pressure that acts upon a filter device used according to the invention in the lower area of the reactor, for instance, in the area of the reactor base, or, if arranged externally, particularly below the reactor, and then connected to the reactor by means of connection means, in such a way that a transmembrane pressure gradient is created by means of the filter element, which enables the filtration of the fluid or suspension to be filtered in an energetically advantageous way. According to the invention, an advantageous embodiment may intend that, if the filter device that is preferably arranged in a housing is arranged below the base of an aerobe operating reactor, a nozzle, particularly a binary nozzle, is arranged in the reactor base, the air and the concentrate fed from the filter device is injected into the reactor, and thereby creates a pressure that acts on the filter device in addition to the hydrostatic pressure, namely a hydrodynamic pressure.

In a further embodiment, the invention relates to a previously mentioned method, whereby the water to be treated is inflow water flowing to a wastewater treatment plant, which is fed to a previously mentioned device for the treatment of water, in which the reactor is constructed as the inflow basin containing the inflow water, and the filtrate discharged according to the previously mentioned method after the separation of the concentrate is fed to an aeration reactor that is down streamed to the inflow basin, which in a preferred embodiment can represent part of an additional device according to the invention at hand. Accordingly, such a procedural step for the treatment of wastewater contains two inventive devices that are series-connected, each having a reactor and a filter device.

A particularly preferred embodiment may intend arranging a pump in front of, or behind the filter device, that is, on the pressure or suction side, which ensures a circulation of the filtrated, or of the fluid or suspension to be filtered, from the reactor into the filter device, and partially, back to it.

A preferred embodiment of the invention at hand intends to feed the fluid/suspension to be filtered from the reactor into the filter device by means of a pump. The filtrate is separated by means of the hollow shaft, and the concentrate, possibly together with air, is fed back into the reactor by means of a nozzle, particularly a binary nozzle, whereby, for instance in a wastewater reactor, desirably high cell densities of microorganisms can be achieved.

A further preferred embodiment may intend to feed the fluid/suspension to be filtered from the reactor into the filter device arranged preferably in a housing, whereby the filtrate is separated by means of the hollow shaft, and the concentrate is fed to a nozzle, particularly a binary nozzle, that is preferably arranged in the reactor base, by means of a pump, which feeds the concentrate together with air into the reactor.

A further preferred embodiment may intend not to feed the concentrate back into the reactor. In such an embodiment the suspension to be filtered can be fed from the reactor to the filter device that is preferably arranged in a housing, by means of a pump. The concentrate is discharged, for instance, into a septic unit, and the filtrate is discharged by means of the hollow shaft. Part of the suspension/fluid fed by means of the pump is not fed to the filter device, but instead directly to a nozzle that is preferably arranged in the reactor base, which possibly feeds the suspension together with air back to the reactor. A certain controlled cell density in the reactor can be adjusted in this way.

Additional advantageous embodiments result from the sub-claims.

The invention is explained in details based on an embodiment example and the related figures.

Figure 1:
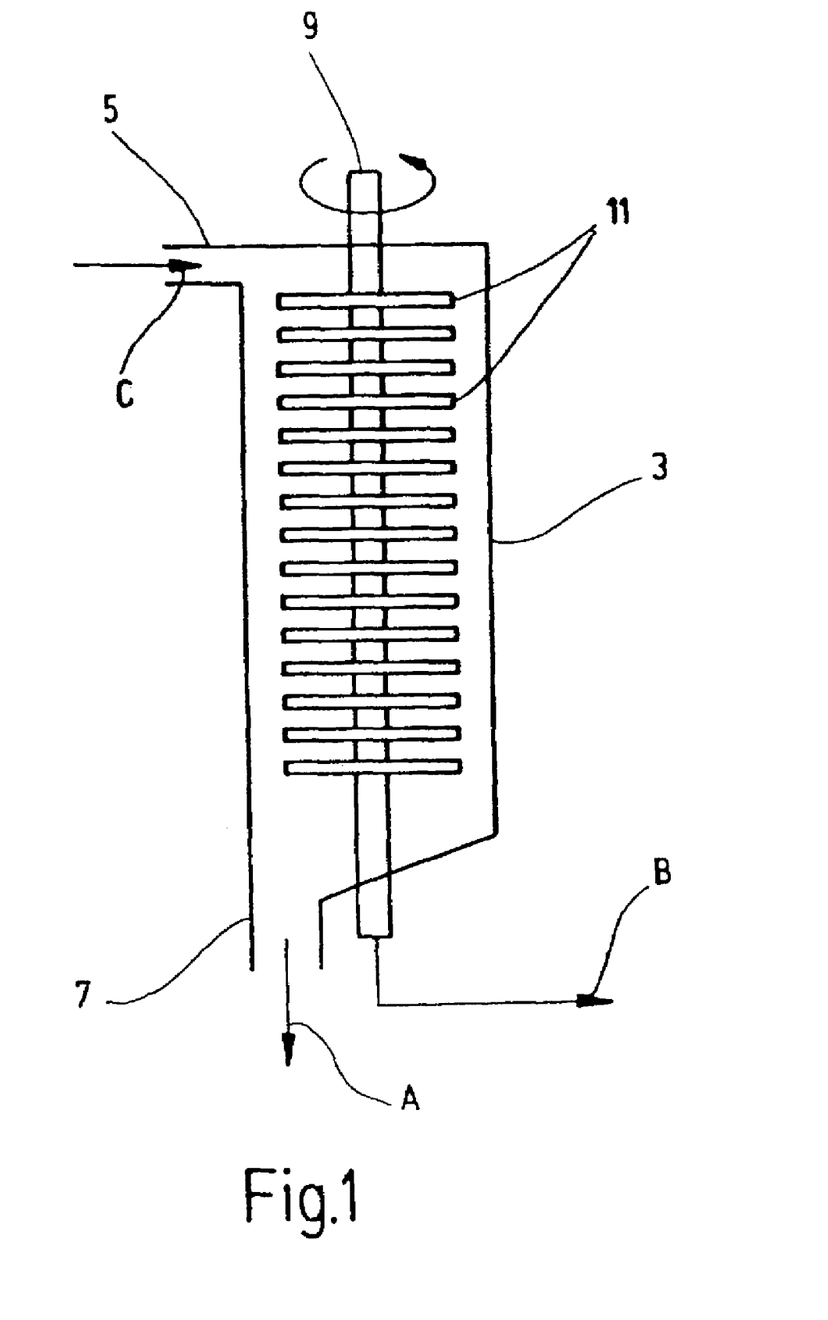
FIG. 1 schematically shows a membrane module with rotating filter disks used according to the invention.

FIG. 1 shows a filter device 1 constructed as a membrane module with a cylindrical housing 3 that has an inflow orifice 5 for the fluid or suspension (C) containing solids, that is to be filtered, that is arranged tangential opposite of the housing, and a discharge orifice 7 for the separated solids, that is the concentrate (A). A hollow shaft 9 is pivot connected in the housing 3 that carries a multitude of filter disks 11 that are pivot-proof connected to it. The filtrate (B) is carried out from the hollow shaft 9.

The pipe-shaped hollow shaft 9 is constructed of one piece, and infiltrates each of the filter disks 11 having central clearance orifices that are not illustrated.

The functionality of the filter device 1 is as follows:

The inventive membrane module 1 used together with an aerobe operating reactor that is not illustrated here, is mounted, for instance, in the fluid circulation on the aeration reactor in front of the not illustrated nozzle in the area of the reactor base so that the delivery flow of the pump can enter into the housing 3 through the input orifice 5. The concentrate that is fed through the output orifice 7 on the nozzle is accelerated to a high velocity in the nozzle, whereby a fluid stream is created in the reactor for the gas dispersion. The hydrodynamic pressure created is used together with the hydrostatic pressure bearing on the membrane module that results from the filling of the reactor for the creation of a transmembrane pressure gradient, and leads to the filtration of the charged fluid. The overflow velocity necessary for preventing the formation of a covering layer is effected by the rotation of the carrier body, and therefore of the filter elements. This operation thereby occurs independent of the fluid circulation in the wastewater treatment plant, and is therefore energetically decoupled from it. Filtrate enters into the interior through the filter disks 11, flows through the fluid connection between the filter disk 11 and the hollow body 9 into the interior of the hollow shaft 9, and is separated by the same. The solids exit the housing 3 through the discharge orifice 7. During the procedure, the hollow shaft 9 and the filter disks 11 that are pivot-proof connected to it rotate so that an overflow velocity is created that leads to a reduction, or avoidance of the formation of a covering layer on the filter disks 11. According to the invention, the overflow velocity is thereby created by the rotation of the hollow shaft, and is thereby decoupled from the inflow velocity and the inflow volume of the suspension to be filtered. Accordingly, the overflow velocity can be freely chosen. This procedure enables a substantially improved energetic operation of, for instance, drinking water treatment plants, or wastewater treatment plants.

Figure 2:
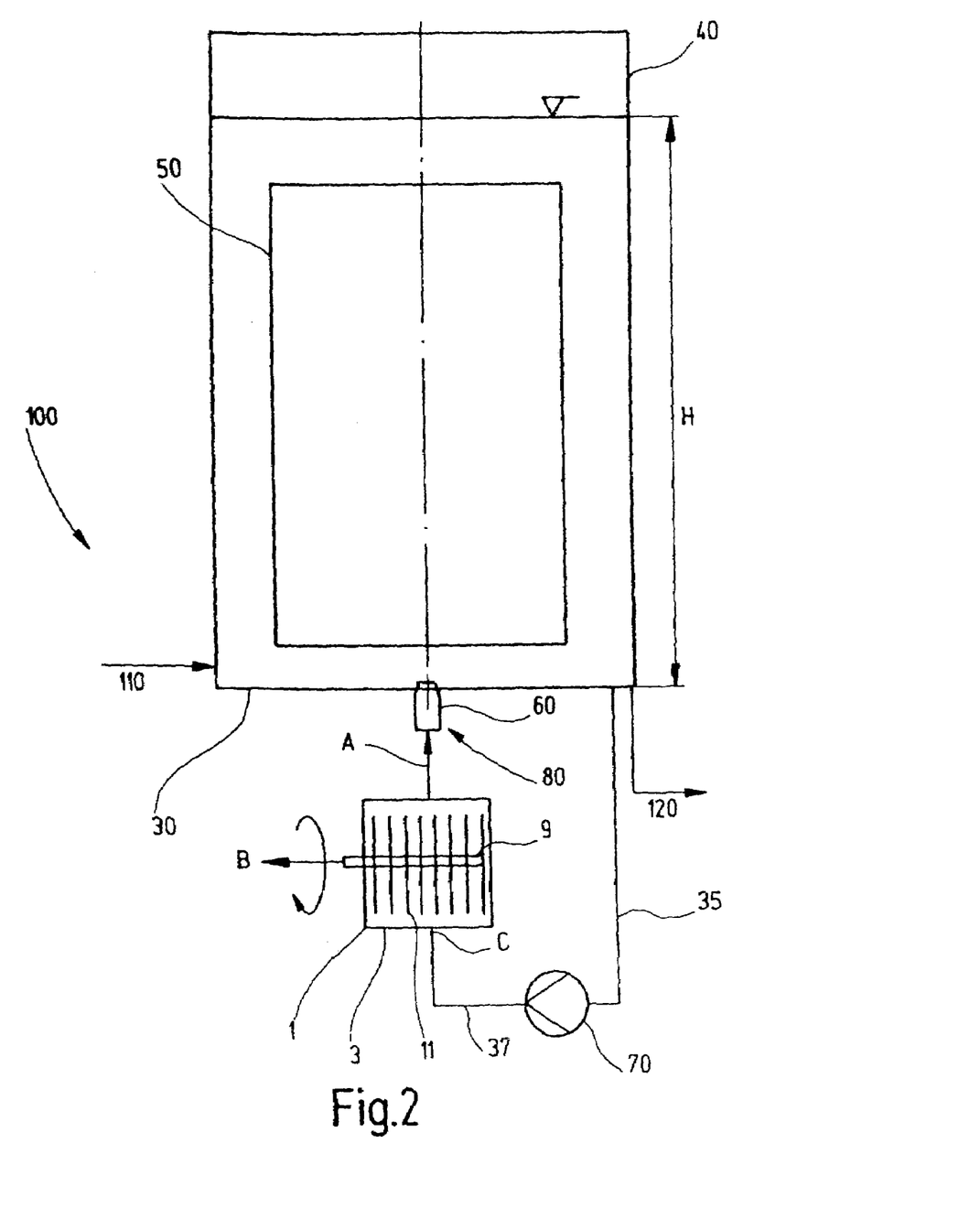
FIGS. 2 to 4 show various embodiments of the inventive wastewater treatment device.

FIG. 2 schematically shows a device 100 according to the invention for the treatment of water comprised of an aerobe working reactor 40 and a filter device 1. The reactor 40 is a wastewater reactor, and is constructed as a loop reactor with an interior flow guide pipe 50. The contents of the reactor are circulated around the flow guide pipe 50, resulting in an intensive thorough mixture. Also illustrated are the input 110 and the output 120 of the reactor, as well as the base 30 of the reactor 40. The reactor has a filling level H, whereby a filling level as high as possible is preferred.

The drive of the circulation flow available in the reactor 40 occurs by means of a fluid/air stream injected at the reactor base 30. For this purpose, a pump 70 that is arranged on the exterior of the reactor 40, suctions wastewater at the base 30, and feeds it to a nozzle 60 that is arranged in the reactor base 30 by means of the lines 35 and 37. The wastewater is jetted into the reactor 40 by the nozzle at high velocity, thereby achieving an intensive gas dispersion together with the suctioned air 80. The membrane module 1 that is arranged below the reactor 40 is located between the pump 70 and the nozzle 60. The membrane module 1 is under the hydrostatic pressure of the fluid head of the wastewater reactor 40, and under the hydrodynamic pressure that is created by the pump 70 with the aid of the nozzle 60. Both pressures create a transmembrane pressure gradient that enables the filtration of the wastewater in a cost-effective way. The filtrate flow B is drained from the hollow shaft 9, while the concentrate flow A is fed to the nozzle 60, and is jetted into the reactor 40 together with air 80.

Figure 3:
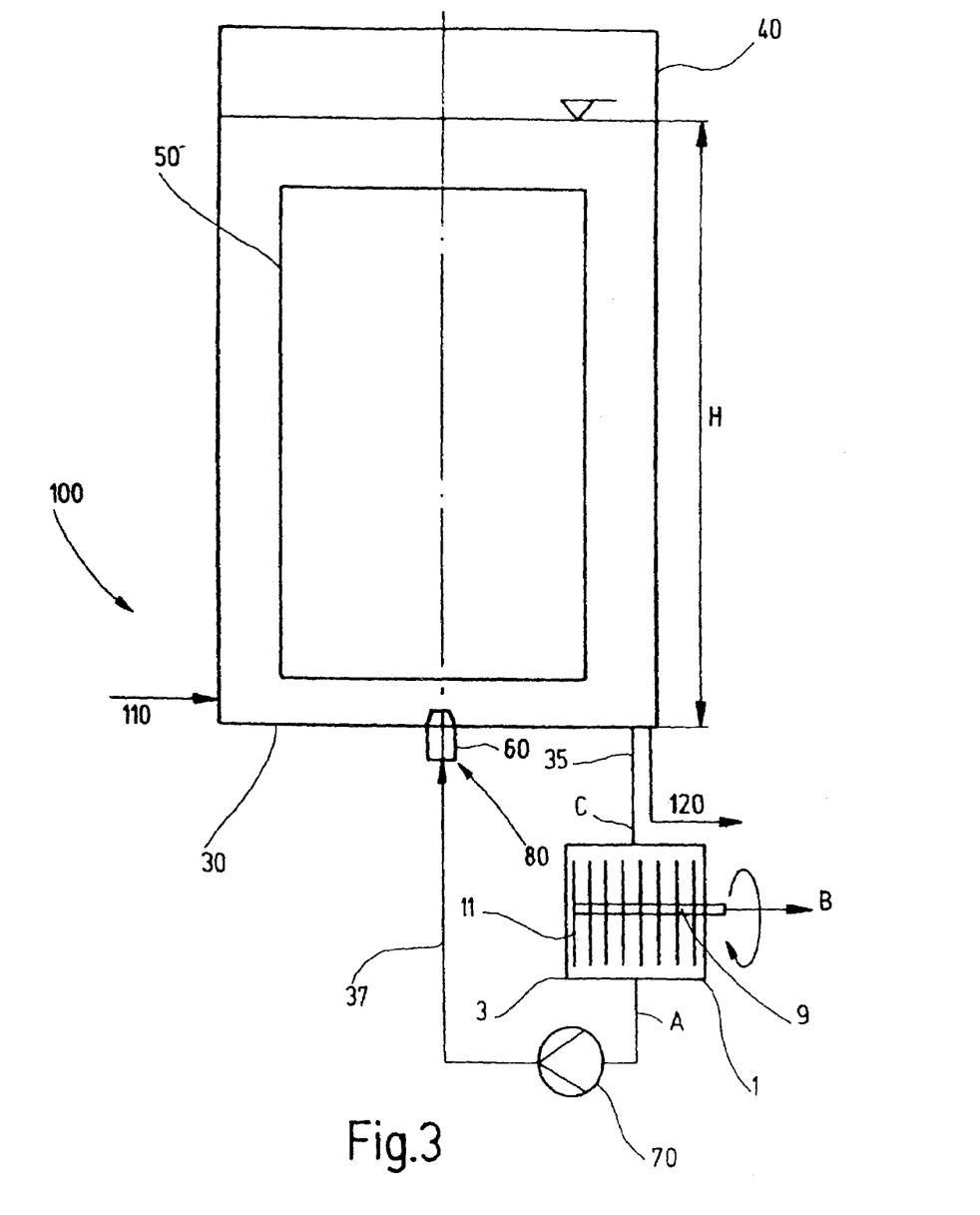

FIG. 3 essentially shows the same wastewater reactor 40 as FIG. 2. The same reference symbols identify assembly or functionally equal parts. Unlike the wastewater treatment plant 100 according to FIG. 2, the filter device 1 according to FIG. 3 is not arranged on the pressure side, but on the suction side of the pump 70 instead so that the hydrostatic pressure merely acts as a transmembrane pressure gradient in this embodiment. Also according to FIG. 3, the filter device 1 is arranged in a housing 3 below the reactor base 30 of the reactor 40.

Figure 4:
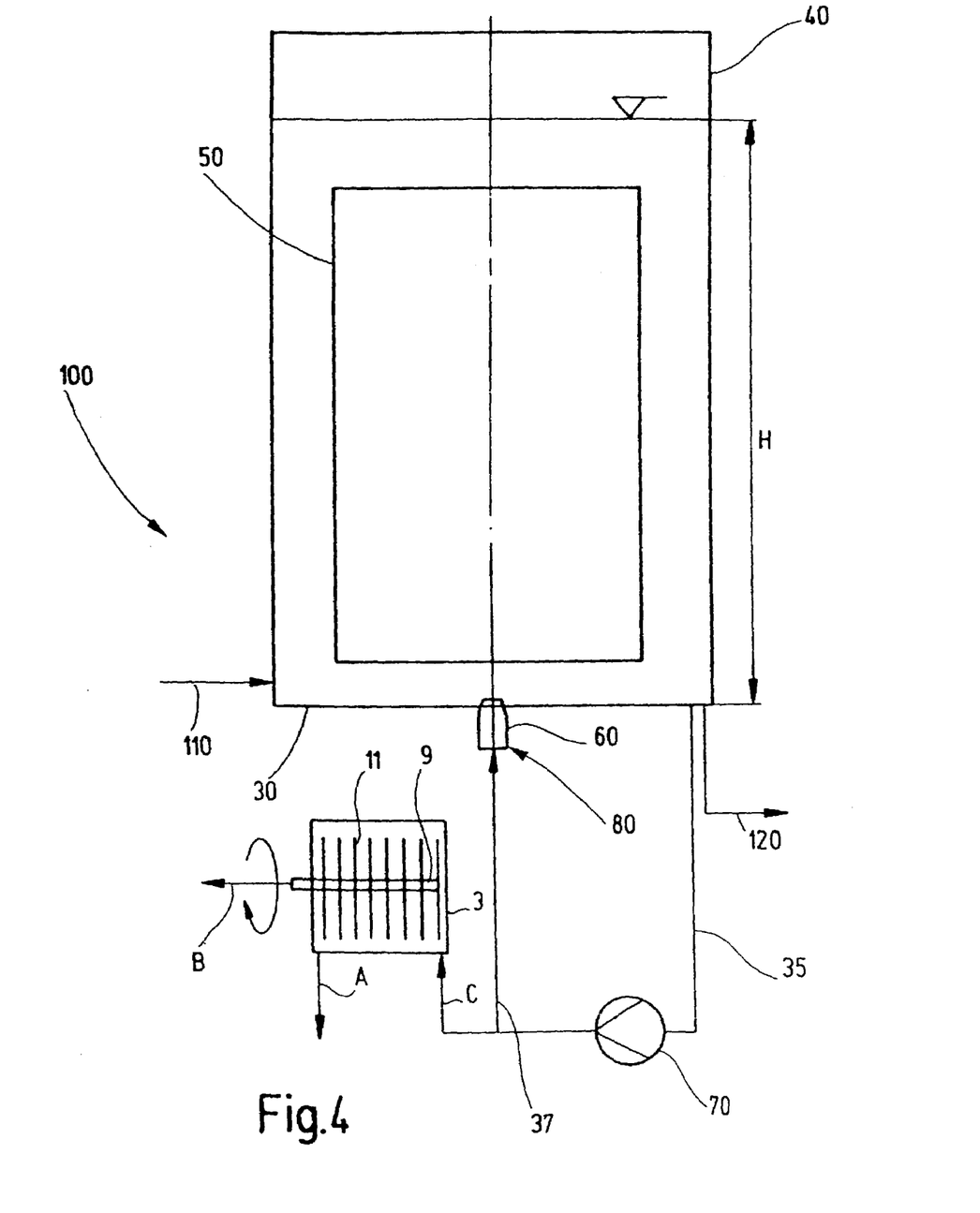

The device according to FIG. 4 essentially shows the same wastewater reactor 40 as FIGS. 2 and 3. The filter device 1 is arranged on the pressure side of the pump 70. Unlike with the device according to FIG. 2, the concentrate flow A, however, is not fed to the nozzle 60, but is withdrawn from the membrane module 1, and can be directly directed to, for instance, the sludge digestion. According to this embodiment of the inventive device, the biomass concentration in the wastewater reactor 40 can be adjusted as desired.

EXAMPLE

The following example serves to illustrate the cost advantage of the inventive apparatus in comparison to a common cross-flow filtration by making reference to FIGS. 1 to 4.

For the biological degradation of industrial wastewater, a modern wastewater treatment plant 100 is operated with a biological step consisting of a loop reactor 40 with a filtration unit 1 occupied by aerobe microorganisms. Wastewater possesses a chemical oxygen consumption (CSB) of approximately 7900 mg/l and uses approximately 20000 m$^3$ per year. It is biologically well degradable with a suction rate of 90% at a hydraulic residence time of about 20 h. The loop reactor 40 has a diameter of 2 m, and a filling level of 15 m, its fluid volume is therefore approximately 45 m$^3$ at a gas content of about 5%. For the oxygen supply of aerobe microorganisms air with a volume flow of about 170 to 200 m$^3$ per hour must be fed to the loop reactor 40 on the bottom, in the area of the base 30. For the dispersion of gas into small bubbles, and therefore for the creation of a sufficiently large matter exchange surface for the oxygen supply, the fed air flow is separated by means of a fluid stream created by a nozzle 60 that is arranged at the base 30 of the reactor. For this purpose, a fluid stream of about 35 m$^3$/h is withdrawn from the loop reactor 40 at the base 30, and fed to the nozzle 60 for the gas dispersion through the lines 35 and 37 with the aid of a pump 70. The hydrodynamic pressure created is approximately 29 psi [2 bar]; the static pressure due to the fluid head is, however, barely 21.75 psi [1.5 bar]. Of course, a gas dispersion may also occur without a nozzle, for instance, by means of static gassing units, such as punched plates, perforated hoses, boards, etc. The output entry required for the fluid stream without consideration of the pump effect rate, is about 2 kW, resulting in a specific hydraulic output entry of below 50 W/m$^3$. In order to increase the active biomass in the system, the loop reactor 40 is equipped with a filtration module 1 (FIG. 2) on the pressure side of the pump 70. It is a rotation disk filter. It consists of 10 individual modules at a length of approximately 1 m, and 100 each ceramic filter disks 11 of a diameter of approximately 0.15 m, and a center pore diameter of approximately 0.1 µm. The modules are driven by means of an electric motor that is not illustrated, at approximately 220 rotations per minute so that a specific filtration flow of 70 l/m$^2$h is the result without any substantial formation of a covering layer. The specific performance requirement of this filtration is approximately 0.13 kWh/m$^3$ without consideration of the motor coefficient.

If a common cross-flow filtration were to be used instead of the described rotation disk filter, the following data would be the result:

Membrane used: ceramic multi-channel element with 7 channels, each of a diameter of 6 mm; center pore diameter 0.1 µm. Length of module 1 m.

At an overflow velocity of 3 m/s, the formation of the covering layer can be acceptably controlled, and a medium specific filtration flow of approximately 70 l/m$^2$h, and therefore comparable values to the inventive device in this point are the result. In order to achieve the required filtration surface of approximately 32 m$^2$, approximately 240 of such cross-flow filtration pipes must be used, which are mounted in a mutual module at 10 individual pipes each, of which then a total of 24 modules are required. The specific performance requirement of this type of cross-flow filtration is about 1.2 kWh per m$^3$ of filtrate, and is therefore nearly ten times higher than that of the inventive combination of wastewater reactor with rotation disk filters. An additional disadvantage of cross-flow filtration is that a high volume flow (pump selection) is required, as well as the tendency to clog up if particles are present in the wastewater to be treated that have a larger diameter than the channel diameter (in this case 6 mm).

The invention claimed is:

1. A method for the treatment of water contained in a reactor, wherein the water to be treated is essentially fed only under the influence of at least one of the group consisting of hydrodynamic and hydrostatic pressure of a filter device with at least one filter element that is pivot-proof connected to a hollow pivoting carrier body and that is fluid-connected, wherein the carrier body is caused to rotate for the creation of an overflow velocity, and filtrate discharged from the interior of the carrier body is separated from concentrate;

wherein the method comprises feeding concentrate back to the reactor through a nozzle; and wherein the nozzle feeds the concentrate to the reactor together with air.

2. The method according to claim 1, wherein the method comprises feeding the water to be treated by means of a pump from the reactor into a filter device positioned below the reactor with at least one filter element that is pivot-proof connected to a hollow, pivoting carrier body, and that is fluid-connected, is filtered essentially only under the influence of one or more of the group consisting of hydrostatic and hydrodynamic pressure, and the filtrate is drained from the carrier body.

3. The method according to one of the claims 1, wherein the method comprises feeding concentrate back to the reactor.

4. The method according to claim 3, wherein the concentrate is fed back into the reactor through a nozzle.

5. A method for the treatment of water contained in a reactor, wherein the water to be treated is essentially fed only under the influence of at least one of the group consisting of hydrodynamic and hydrostatic pressure of a filter device with at least one filter element that is pivot-proof connected to a hollow pivoting carrier body and that is fluid-connected, wherein the carrier body is caused to rotate for the creation of an overflow velocity, and filtrate discharged from the interior of the carrier body is separated from concentrate;

wherein the water to be treated by means of a pump from the reactor into a filter device positioned below the reactor with at least one filter element that is pivot-proof connected to a hollow, pivoting carrier body, and that is fluid-connected, is filtered essentially only under the influence of one or more of the group consisting of hydrostatic and hydrodynamic pressure, and the filtrate is drained from the carrier body; and wherein the concentrate is not fed to the reactor.

6. A method for the treatment of water contained in a reactor, wherein the water to be treated is essentially fed only under the influence of at least one of the group consisting of hydrodynamic and hydrostatic pressure of a filter device with at least one filter element that is pivot-proof connected to a hollow pivoting carrier body and that is fluid-connected, wherein the carrier body is caused to rotate for the creation of an overflow velocity and filtrate discharged from the interior of the carrier body is separated from concentrate;

whereby the concentrate is fed to an anaerobe working fermentation plant.

7. A method for the treatment of water selected from at least one of the group consisting of industrial water and wastewater which is contained in a reactor, comprising:

feeding the water to be treated is into a filter device with at least one filter element that is pivot-proof connected to a hollow pivoting carrier body and that is fluid-connected, the carrier body is caused to rotate for the creation of a centrifugal force on the surface of the filter element, and the filtrate discharged from the interior of the carrier body is separated from the concentrate;

adjusting the concentration contained in the reactor independent of the concentration contained in the filter device; and feeding the concentration directly from the filter device to a septic unit without the interpositioning of any additional concentration steps.

8. The method according to claim 7, wherein the water is inflow water for a wastewater treatment plant and is fed to a device in which the reactor is constructed as an inflow basin, and the discharged filtrate is fed to an aeration reactor down streamed to the inflow basin.

9. The method according to claim 8, wherein the concentrate is fed to an anaerobe working fermentation plant.

10. The method according to claim 7, wherein the concentrate is fed to an anaerobe working fermentation plant.

11. A device for the treatment of water, comprising:
a reactor;
a filter device disposed in or below the base of the reactor, the filter device having at least one filter element that is pivot-proof connected to a hollow pivoting carrier body, the interior of which is at a fluid connection to the interior of the carrier body in such a way that filtrate can flow from the interior of at least one filter element into the interior of the carrier body, and can there be separated; and
further comprising a binary nozzle in the reactor base.

12. The device according to claim 11, whereby the filter device is arranged in the reactor.

13. The device according to claim 11, whereby the filter device is arranged on the exterior of the reactor.

14. The device according to claim 11, wherein the reactor is a loop reactor.

15. The device according to claim 11, wherein the reactor has an interior flow guide pipe.

16. The device according to one of the claim 11, further comprising a pump arranged between the reactor and the filter device.

17. The device according to claim 16, wherein the filter device is arranged on the suction side of the pump.

18. The device according to claim 16, wherein the filter device is arranged on the pressure side of the pump.

19. The device according to claim 11, wherein filter element is a filter disk.

20. The device according to claim 11, wherein the carrier body is a hollow shaft.

21. The device according to claim 20, wherein the hollow shaft is constructed of one piece, and has at least one orifice enabling the entrance of the filtrate into the hollow shaft in the connection area to at least one filter disk.

22. A device for the treatment of water, comprising:
a reactor;
a filter device disposed in or below the base of the reactor, the filter device having at least one filter element that is pivot-proof connected to a hollow pivoting carrier body, the interior of which is at a fluid connection to the interior of the carrier body in such a way that filtrate can flow from the interior of at least one filter element into the interior of the carrier body, and can there be separated;
wherein the carrier body is a hollow shaft; and
wherein the hollow shaft is constructed of multiple pieces and at least one filter disk is arranged intermittent and fluid-tight between the individual sections of the hollow shaft.

23. The device according to claim 22, wherein the carrier body is arranged pivot-linked to at least one filter element in a housing.

24. The device according to claim 11, wherein the filter device is formed of modular construction.

25. A device for the treatment of water, comprising:
a reactor;
a filter device disposed in or below the base of the reactor, the filter device having at least one filter element that is pivot-proof connected to a hollow pivoting carrier body, the interior of which is at a fluid connection to the interior of the carrier body in such a way that filtrate can flow from the interior of at least one filter element into the interior of the carrier body and can there be separated; and
further comprising assemblies for the influencing of the flow in the housing.

26. The device according to claim 11, wherein the water is inflow water to a wastewater treatment plant, and the reactor is the inflow basin containing this water.

27. The device according to claim 11, wherein the water is industrial water or surface water, and the reactor is a reservoir basin.

28. The device according to claim 11, wherein the water is wastewater, and the reactor is a wastewater reactor.

* * * * *